United States Patent
Fu

(10) Patent No.: US 11,941,685 B2
(45) Date of Patent: Mar. 26, 2024

(54) VIRTUAL ENVIRONMENT ARRANGEMENT AND CONFIGURATION

(71) Applicant: eBay Inc., San Jose, CA (US)

(72) Inventor: Yuyangzi Fu, Shanghai (CN)

(73) Assignee: eBay Inc., San Jose, CA (US)

( * ) Notice: Subject to any disclaimer, the term of this patent is extended or adjusted under 35 U.S.C. 154(b) by 59 days.

(21) Appl. No.: 17/173,660

(22) Filed: Feb. 11, 2021

(65) Prior Publication Data

US 2022/0230233 A1 Jul. 21, 2022

(30) Foreign Application Priority Data

Jan. 18, 2021 (CN) .......................... 202110062481.9

(51) Int. Cl.
*G06Q 30/0601* (2023.01)
*G06F 9/455* (2018.01)
*G06F 3/01* (2006.01)

(52) U.S. Cl.
CPC ......... *G06Q 30/0643* (2013.01); *G06F 9/455* (2013.01); *G06Q 30/0601* (2013.01); *G06F 3/011* (2013.01)

(58) Field of Classification Search
CPC ....................... G06Q 30/0601; G06Q 30/0643
See application file for complete search history.

(56) References Cited

U.S. PATENT DOCUMENTS

| | | | | |
|---|---|---|---|---|
| 5,946,665 A | * | 8/1999 | Suzuki | G06Q 30/06 715/848 |
| 2009/0115776 A1 | * | 5/2009 | Bimbra | G06T 19/00 345/530 |
| 2009/0222424 A1 | * | 9/2009 | Van | G06Q 30/0601 715/848 |
| 2009/0315916 A1 | * | 12/2009 | Husemann | G06Q 30/06 715/850 |
| 2013/0085807 A1 | | 4/2013 | Cincotta | |
| 2014/0214629 A1 | | 7/2014 | Azam et al. | |
| 2015/0309705 A1 | * | 10/2015 | Keeler | G06N 20/00 705/27.2 |
| 2017/0148082 A1 | * | 5/2017 | Murahari | G06Q 30/0643 |

(Continued)

FOREIGN PATENT DOCUMENTS

| | | |
|---|---|---|
| JP | 2001175752 A | 6/2001 |
| JP | 2003241700 A | 8/2003 |
| JP | 2007094635 A | 4/2007 |

OTHER PUBLICATIONS

Streetify Launches the World's Biggest Consumer Deals Site. PR Newswire Europe Including UK Disclose [New York] Mar. 19, 2020. (Year: 2020).*

(Continued)

*Primary Examiner* — Michael Misiaszek
(74) *Attorney, Agent, or Firm* — FIG. 1 Patents

(57) ABSTRACT

Virtual environment arrangement and configuration techniques are described. In one example, virtualization techniques are employed to generate a virtual environment as implemented via a virtual reality platform by one or more computing devices. The virtual environment includes virtual stores arranged along virtual streets. Virtual digital content is included in the stores, such as to initiate conversion of a good or service represented by the content. Configuration of the virtual environment is based on user, provider, and/or machine learning inputs.

20 Claims, 8 Drawing Sheets

(56) References Cited

U.S. PATENT DOCUMENTS

| | | | |
|---|---|---|---|
| 2018/0137561 A1 | 5/2018 | Glazer et al. | |
| 2018/0315117 A1* | 11/2018 | Jephcott | G06T 13/40 |
| 2019/0019242 A1* | 1/2019 | Bajpai | G06Q 30/0603 |
| 2019/0205333 A1* | 7/2019 | Piramuthu | G06V 20/20 |
| 2019/0251603 A1* | 8/2019 | Jaatinen | G06N 3/006 |
| 2020/0380788 A1* | 12/2020 | Hutten | A63F 13/67 |
| 2021/0142394 A1* | 5/2021 | Milicevic | G06Q 30/0643 |

OTHER PUBLICATIONS 21217227.4 , "Extended European Search Report received for European Patent Application No. 21217227.4 dated Jun. 10, 2022", Jun. 10, 2022, 14 Pages.

* cited by examiner

VIRTUAL ENVIRONMENT ARRANGEMENT AND CONFIGURATION

BACKGROUND

The amount of exposure users have to digital content continues to increase. Users, for instance, have access to hundreds of digital documents, thousands of digital movies, tens of thousands of digital images, a seemingly endless multitude of webpages, and so on. Accordingly, techniques that have been developed to manage access to digital content are challenged by the amount of digital content that is made available to the users.

Consider an instance involving user navigation (e.g., using a browser executed by a computing device) between webpages having items of digital content of interest. Conventional techniques made available by the computing device to manage this interaction rely on "favoriting" particular webpages to be able to locate these webpages during subsequent navigation. However, this technique may quickly become unwieldy due to the sheer number of items that may be of interest and further are difficult to navigate. Additionally, even though techniques have been developed to expand a richness in display and user interaction with digital content through virtualization (e.g., augmented reality and virtual reality), this increase in richness causes additional challenges in navigation through representations of digital content and thus may fail for their intended purpose.

SUMMARY

Virtual environment arrangement and configuration techniques are described. In one example, virtualization techniques are employed to generate a virtual environment as implemented via a virtual reality platform by one or more computing devices. The virtual environment includes virtual stores arranged along virtual streets. Virtual digital content is included in the stores, such as to initiate conversion of a good or service represented by the content. Configuration of the virtual environment is based on a user, provider, and/or machine learning inputs.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
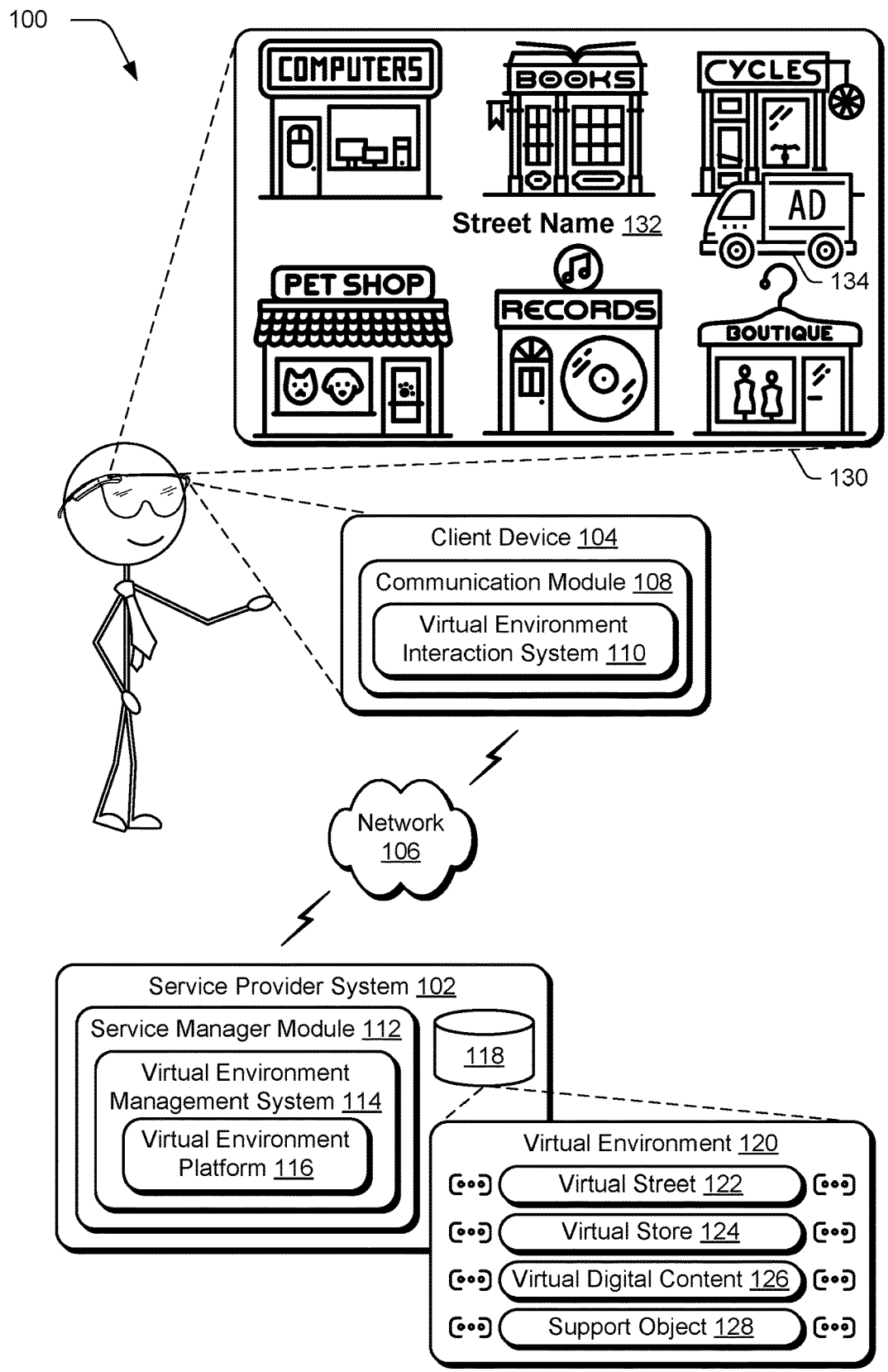
FIG. 1 is an illustration of an environment in an example implementation that is operable to employ virtual environment arrangement and configuration techniques described herein.

The prevalence and multitude of digital content with which even casual users may interact with using computing devices introduces numerous challenges that affect operation of the computing device as well as a user's ability to interact with the device. These challenges are further exacerbated when confronted with techniques used to increase richness in user interaction supported by the computing device.

Accordingly, virtual environment arrangement and configuration techniques are described that address an increased richness supported by computing devices yet still support navigation through the digital content. In one example, virtualization techniques are employed to generate a virtual environment as implemented via a virtual reality platform by one or more computing devices. The virtualization techniques include use of augmented reality in which the virtual environment augments a direct view of a physical surroundings of the computing device as well as use of virtual reality in which the virtual environment replaces the direct view of the physical surroundings.

The virtual environment platform is configured to manage arrangement and configuration of a virtual environment for access by originators and viewers as well as expose functionality to manage creation of this environment. From a viewpoint of a user of a client device, for instance, functionality is exposed by the virtual environment platform to create representations of digital content (e.g., webpages, websites) as virtual stores that mimic an appearance of a physical store in a physical environment. This includes specifying a "look and feel" of the virtual stores. Functionality is also exposed to specify an arrangement of the virtual stores within the environment in relation to each other, e.g., as groupings arranged according to virtual streets.

User inputs, for instance, may be received that specify arrangement of virtual stores along corresponding streets as well as indications of criteria (e.g., user specified or automatically generating using natural language processing techniques) used to specify the groupings. Virtual digital content representing goods or service available for conversion within the virtual stores may also be arranged through interaction with the virtual environment platform by the user. In this way, a user may customize the virtual environment in a way that is intuitive to the user.

The virtual environment platform is also configured to support interaction by a provider of the virtual stores. For instance, the virtual environment platform is configurable to expose a software development kit (SDK) to create virtual stores and virtual digital content representative of goods or services available for purchase within the virtual stores. As above, this includes an ability to customize a "look and feel" of the virtual store as well as the virtual content within the store, e.g., to mimic a physical store and physical items.

This also includes an ability for the provider to set criteria that is usable to arrange the virtual stores, e.g., along streets within the virtual environment with other virtual stores automatically and without user intervention. The criteria, for instance, may include a set of tags specified by the user which describe an underlying purpose of the virtual store, theme, visual characteristics, and so forth. The tags are then usable by the virtual environment platform to arrange the virtual environment, automatically and without user intervention. In this way, a provider of the virtual stores is given a degree of control of how the virtual store is arranged by the virtual environment platform in relation to other stores. Other examples are also contemplated, such as to assign tags using machine learning classification techniques. As a result, functionality of the SDK improves efficiency of user interaction in creating and managing virtual stores and virtual digital content.

The virtual environment platform is also configured to leverage machine learning to support automated arrangement of virtual stores, virtual digital content within the virtual stores, as well as a look and feel of the virtual stores and virtual digital content. The virtual environment platform, for instance, may train a model using machine learning to manage arrangement of the virtual stores based on likelihood of achieving an outcome, e.g., conversion of a good or service. Other examples include training a model to adjust an appearance of the virtual stores and/or virtual digital content, e.g., to also adjust the appearance to increase a likelihood of achieving an outcome such as conversion. The virtual environment platform, for instance, may process data describing user interaction with digital content and apply machine learning through use of a model to identify characteristics that affect achieving an outcome. Those characteristics, as identified by the model, are then exposed to configure the virtual environment, automatically and without user intervention.

Thus, training data used to train the model may originate from a variety of sources, including based on past user interaction with virtual environments, virtual stores, and/or the virtual digital content disposed thereon. Training data may also originate "outside" of the virtual environment, e.g., through monitored user interaction with other digital content such as webpages, digital marketing content (e.g., advertisements), and so forth. Training data may also include data describing user characteristics, such as demographic information, user preferences regarding an appearance of the virtual stores and virtual digital content, and so forth. In this way, the virtual environment platform leverages machine learning to aid user interaction and improve computing device operation through improved accuracy, further discussion of these and other examples is included in the following sections and shown using corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Virtualization Environment

FIG. 1 is an illustration of a digital medium environment 100 in an example implementation that is operable to employ virtual environment arrangement and configuration techniques described herein. The illustrated environment 100 includes a service provider system 102 and a client device 104 that are communicatively coupled via a network 106, e.g., the Internet. Computing devices that implement the service provider system 102 and client device 104 are configurable in a variety of ways.

A computing device, for instance, is configurable as a desktop computer, a laptop computer, a mobile device (e.g., assuming a handheld configuration such as a tablet or mobile phone), a wearable device (e.g., a digital watch, digital goggles as illustrated), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" for the service provider system and as further described in FIG. 8.

The client device 104 includes a communication module 108 that is representative of functionality to communicate with the service provider system 102 via the network 106. Examples include network-enabled applications such as browsers, plug in modules, and so forth. The communication module 108 further includes a virtual environment interaction system 110 that is configured to support interaction and rendering of a virtual environment. Motions sensors are usable to support navigation through these environments, such as through the use of accelerometers, image capture, time of flight devices, acoustic or electronic wave reflection techniques, and so on. Voice navigation is also supported in which a spoken utterance of a user is utilized to initiate a search of virtual stores, virtual streets, virtual digital content, and so on.

In an example of augmented reality, the virtual environment is provided as part of the live stream of digital images of physical surroundings of the client device 104 that are captured by a digital camera of the client device 104 and displayed in a user interface by a display device. In this way, the virtual environment augments a live view of the physical environment 108, e.g., as "if it was really there." In an example of virtual reality, the virtual environment replaces a direct view of the physical surroundings with a virtualization of a physical environment.

The service provider system includes a service manager module 112 that is configured to manage provision of digital services for access via the network 106. An example of this functionality is illustrated as a virtual environment management system 114 as implementing a virtual environment platform 116. The virtual environment platform 116 is implemented functionality to create, edit, arrange, and disseminate a virtual environment 120, illustrated as maintained in a storage device 118.

The virtual environment 120 is configurable to include one or more of virtual reality streets 122, virtual stores 124, virtual digital content 126, and support objects 128 that represent digital content and support user interaction with that content. In an illustrated example 130 rendered by the client device 104, virtual stores 124 are arranged in groups along virtual street 122. Virtual digital content 126 is disposed within the virtual stores 124 that is representative of goods or services available for purchase. For example, selection of an item of virtual digital content 126 is configured to initiate purchase of the represented good or service. Support objects 128 represent additional functionality that may be added to the virtual environment, illustrated examples of which include an indication 132 of a street name (e.g., listing criteria used to group the virtual stores 124 along a virtual street), an example 134 of a support object depicting a mobile billboard having an advertisement as digital marketing content. A variety of other examples are also contemplated.

As previously described, the virtual environment platform 116 is implemented by the virtual environment management system 114 to support a wide range of functionality in a wide range of usage scenarios. In a first example, the virtual environment 120 is arranged and customized based on identification of a user that accesses the environment, further discussion of which is described in relation to FIGS. 2-4. In a second example, machine learning techniques are employed for configuration of the virtual environment 120 by the virtual environment platform 116, further discussion of which may be found in relation to FIGS. 5-6. In a third example, the virtual environment platform 116 supports functionality to customize virtual stores and virtual digital content 126 by a provider associated with the virtual store by exposing a software development kit (SDK), further discussion of which may be found in relation to FIG. 7.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
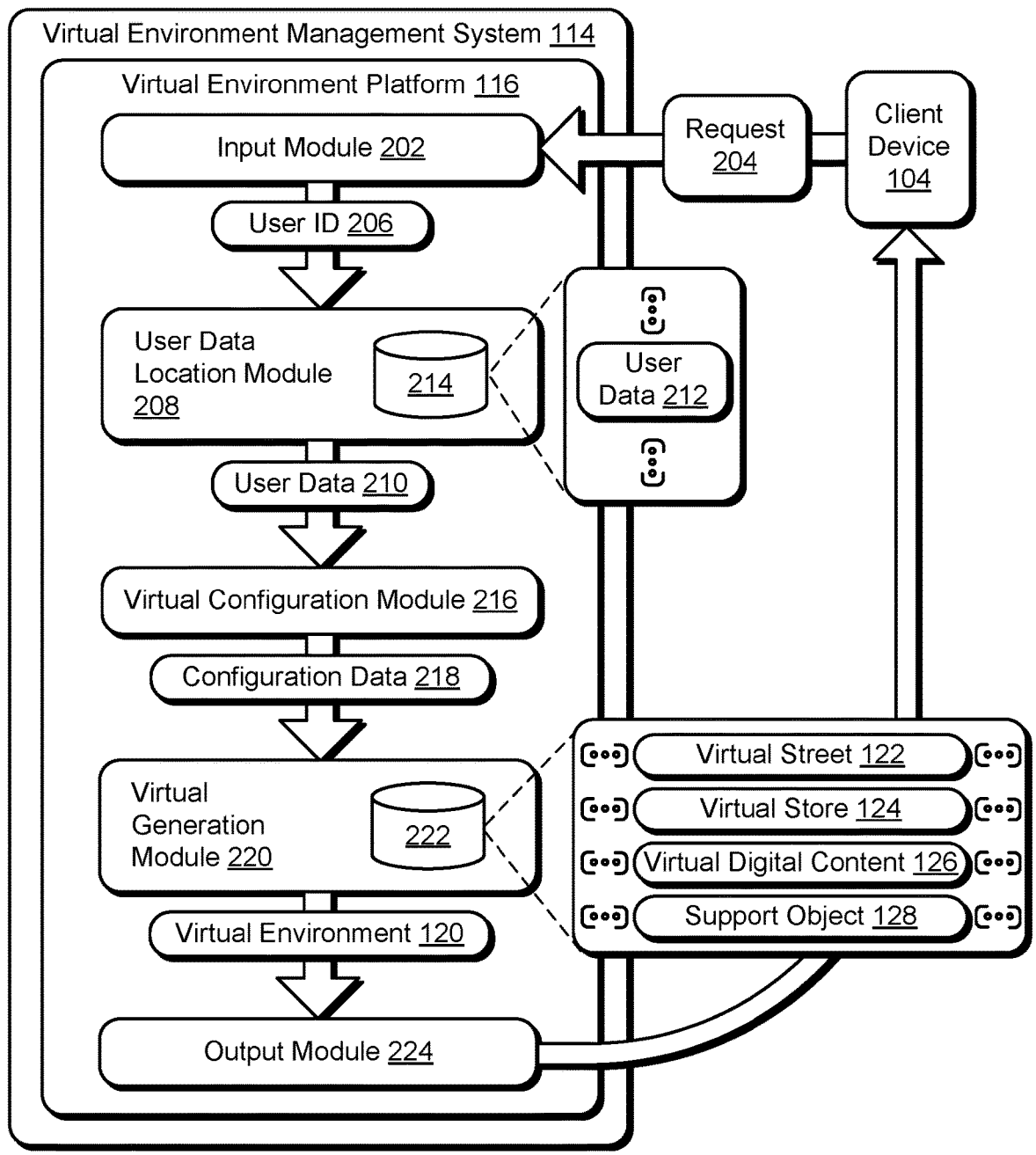
FIG. 2 depicts a system in an example implementation showing operation of a virtual environment management system of FIG. 1 as implementing a virtual environment platform to configure an arrangement of virtual stores.
Figure 3:
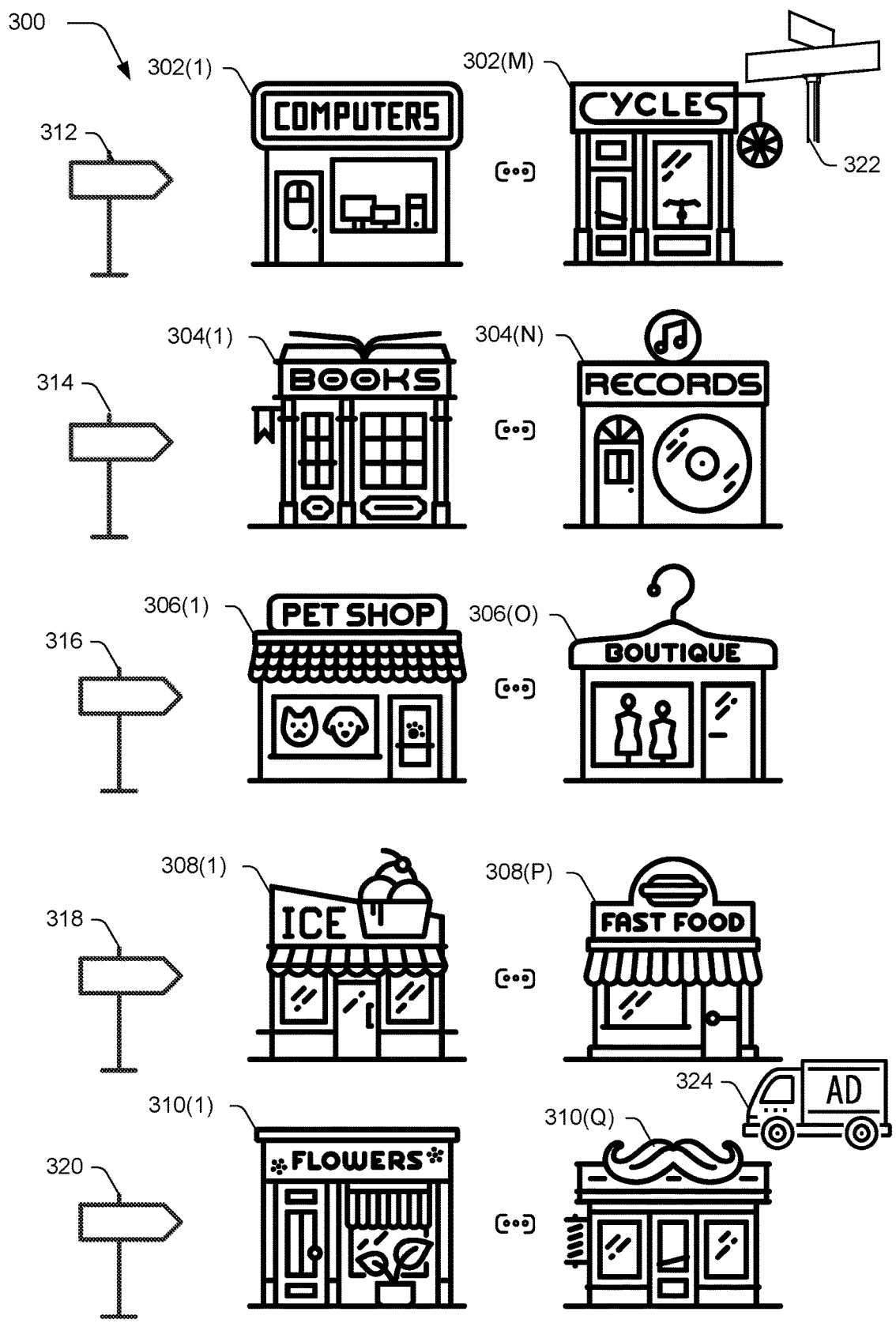
FIG. 3 depicts an example of a virtual environment configured as described in relation to FIG. 2.
Figure 4:
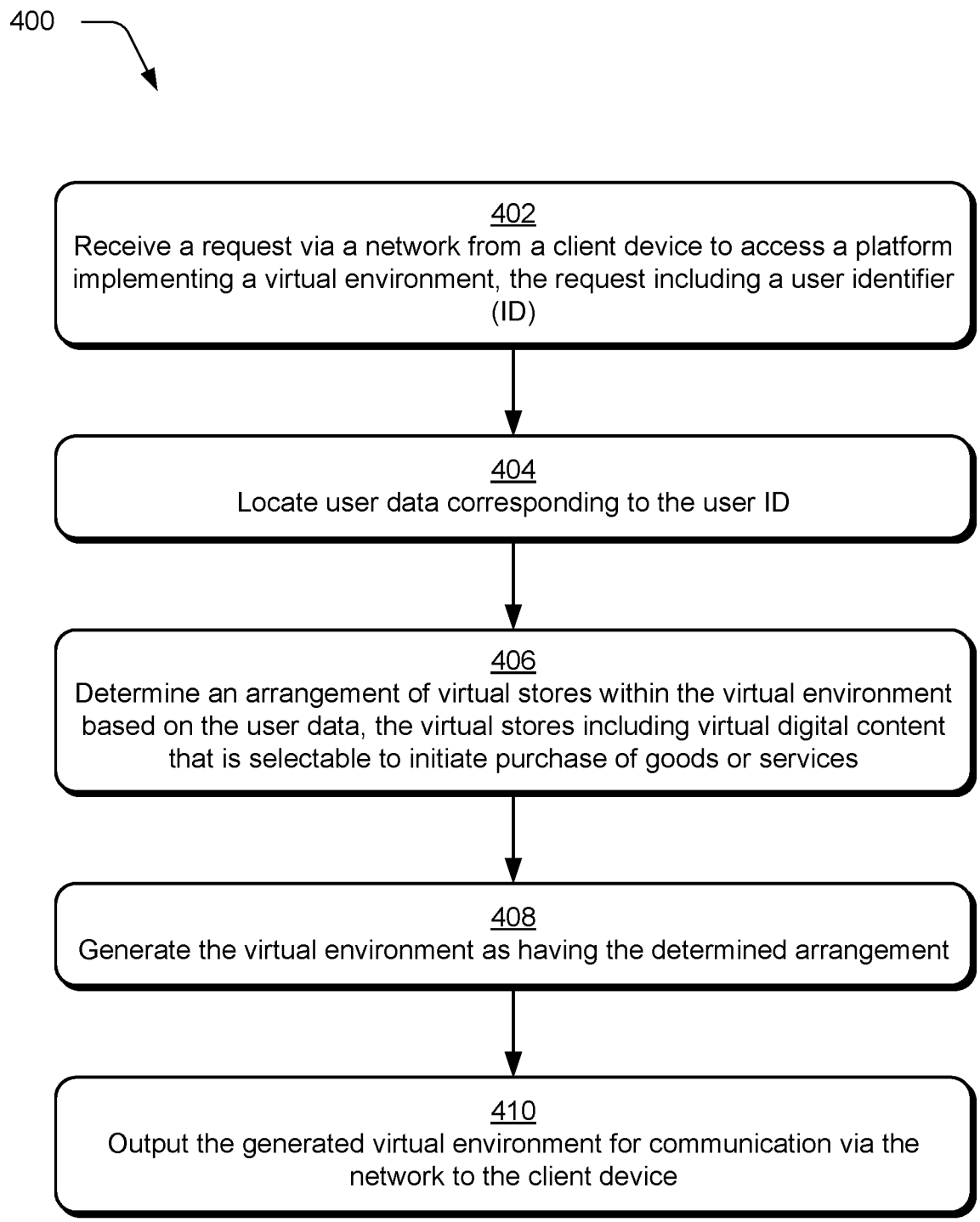
FIG. 4 is a flow diagram depicting a procedure in an example implementation in which a virtual environment is configured by a virtual platform for output to a client device.

FIG. 2 depicts a system 200 in an example implementation showing operation of the virtual environment management system 114 as implementing a virtual environment platform 116 configured to arrange virtual stores within a virtual environment. FIG. 3 depicts an example 300 of a virtual environment 120 configured using the system of FIG. 2. FIG. 4 depicts a procedure 400 in an example implementation in which a virtual environment is configured by a virtual platform for output to a client device.

The following discussion describes techniques that may be implemented utilizing the previously described systems and devices. Aspects of the procedure are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

To begin in this example, an input module 202 receives a request 204 via a network 106 from a client device 104 to access a platform (e.g., virtual environment platform 116) implementing a virtual environment 120. The request 204 includes a user identifier (ID) (block 402). The client device 104, for instance, may utilize a browser to navigate to a network address, via which, the virtual environment 120 is to be made available. The request 204 includes a user ID 206 associated with the user, e.g., as a "cookie" to any other technique that is usable to identify the user including based on IP address and the like.

The user ID 206 is passed from the input module 202 to a user data location module 208. The user data location module 208 is representative of functionality to locate user data 210 based on the user ID 206 from user data 212 stored in a storage device 214 (block 404). The user data 212 is configurable in a variety of ways. In one example, the user data 212 is manually entered by a user, such as to set a preferred arrangement of virtual stores 124 and/or virtual streets 122 on which the virtual stores 124 are grouped, virtual digital content 126 within the virtual stores 124, appearance (e.g., of the virtual streets 122, virtual stores 124, virtual digital content 126, support objects 128, and so on as further described in relation to FIG. 7.

In another example, the user data 212 describes characteristics associated with the user. The characteristics include demographics of the user, characteristics of the client device 104 (e.g., software and/or hardware), and so forth. Other examples include user data 212 that describes past user interaction with virtual environments, other digital content (e.g., conversion associated with digital marketing content), and so forth. This data is usable to train a model using machine learning to then configure virtual stores 124, virtual streets 122, virtual digital content 126, support objects 128, and so on as further described in relation to FIGS. 5 and 6.

The user data 210 is passed from the user data location module 208 as an input to a virtual configuration module 216. The virtual configuration module 216 is configured to determine an arrangement of virtual stores 124 within the virtual environment 120 based on the user data 212. The virtual stores 124 in this example include virtual digital content 126 that is selectable to initiate purchase of goods or services (block 406). The user data 210, for instance, may specify the configuration. Other examples include automated generation of the configuration data 218 by a model trained using machine learning.

The user data 210, for instance, may be processed by a model trained using training data as part of machine learning, e.g., previous user data collected for that user ID 206, a collection of user IDs, and so forth. The model is trained to accomplish a variety of different outcomes, such as to arrive at an arrangement of virtual stores 124 having similar criteria, based on likelihood of being of interest to a corresponding user, to assign tags to virtual stores for grouping along virtual streets, and so forth. In this way, the model may be employed to determine correlations between virtual stores 124 and virtual digital content 126 that is not detectable by a human being (e.g., as hidden states) and leverage those correlations to generate the configuration data 218. Other examples are also contemplated, such as to leverage identifying information output by providers associated with the virtual stores 124 as illustrated and further described in relation to FIG. 7.

The virtual environment 120 is then generated by a virtual generation module 220 as having the determined arrangement (block 408) specified by the configuration data 218. The virtual generation module 220, for instance, may access virtual streets 122, virtual stores 124, virtual digital content 126, support objects 128, and so on that are maintained in a storage device 222. The virtual generation 220 then arranges the virtual stores 124 along virtual streets 122 as indicated.

This also includes arrangement of virtual digital content 126 within those stores, which may be specified by the user, provider, and/or model using machine learning. Once generated, the virtual environment 120 is output by an amount module 224 for communication via the network 106 to the client device 104 (block 410), e.g., for rendering and subsequent user navigation to purchase goods or services.

In the illustrated example 300 of FIG. 3, the virtual environment 120 includes a plurality of virtual stores 302(1)-302(M), 304(1)-304(N), 306(1)-306(O), 308(1)-308(P), 310(1)-310(Q) grouped along corresponding virtual streets 312, 314, 316, 318, 320. The virtual streets 312-320 are illustrated as including indications (depicted as a mimicking virtual signage) of criteria used to group the respective virtual stores together along a corresponding axis. Additional axis may also be used with corresponding indication 322 such that streets and grouping of the virtual stores is performed for multiple criteria together, e.g., as a matrixed arrangement. A first axis, for instance, may be used to group the virtual stores based on subject matter whereas a second axis is used to group the virtual stores based on frequency of access. An additional axis may also be employed.

The virtual environment 120 of FIG. 3 also includes an example of a support object 324, which is depicted as mimicking a physical mobile billboard on a vehicle that moves through the virtual environment 120 and displays digital marketing content. The digital marketing content, for instance, may be generated based on machine learning techniques to increase a probability of achieving an outcome, e.g., conversion of a good or service, initiated through selection of the object in the user interface. Other examples of support objects include signage disposed on corresponding virtual stores, depictions on park benches, and so forth. Navigation through the environment is supported using a variety of techniques, such a motion sensing, head tracking, handheld controllers, etc. In this way, the virtual environment 120 supports user navigation in a manner that is readily understood and intuitive through a multitude of content and as such increases operational efficiency of computing devices that implement these techniques as well as user interaction with these devices.

Figure 5:
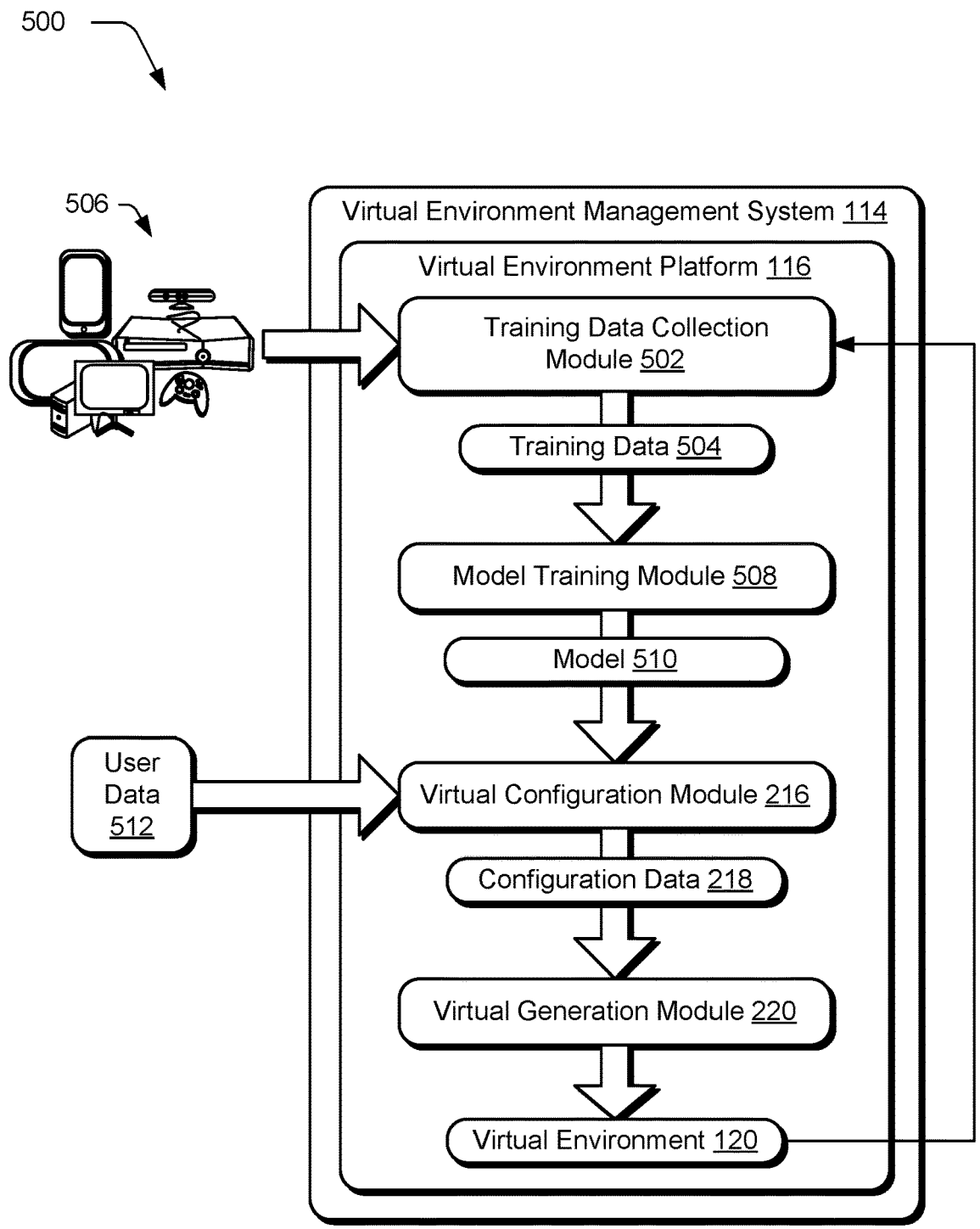
FIG. 5 depicts a system in an example implementation showing operation of the virtual environment platform of FIG. 2 in greater detail as employing machine learning techniques as part of configuration of a virtual environment.
Figure 6:
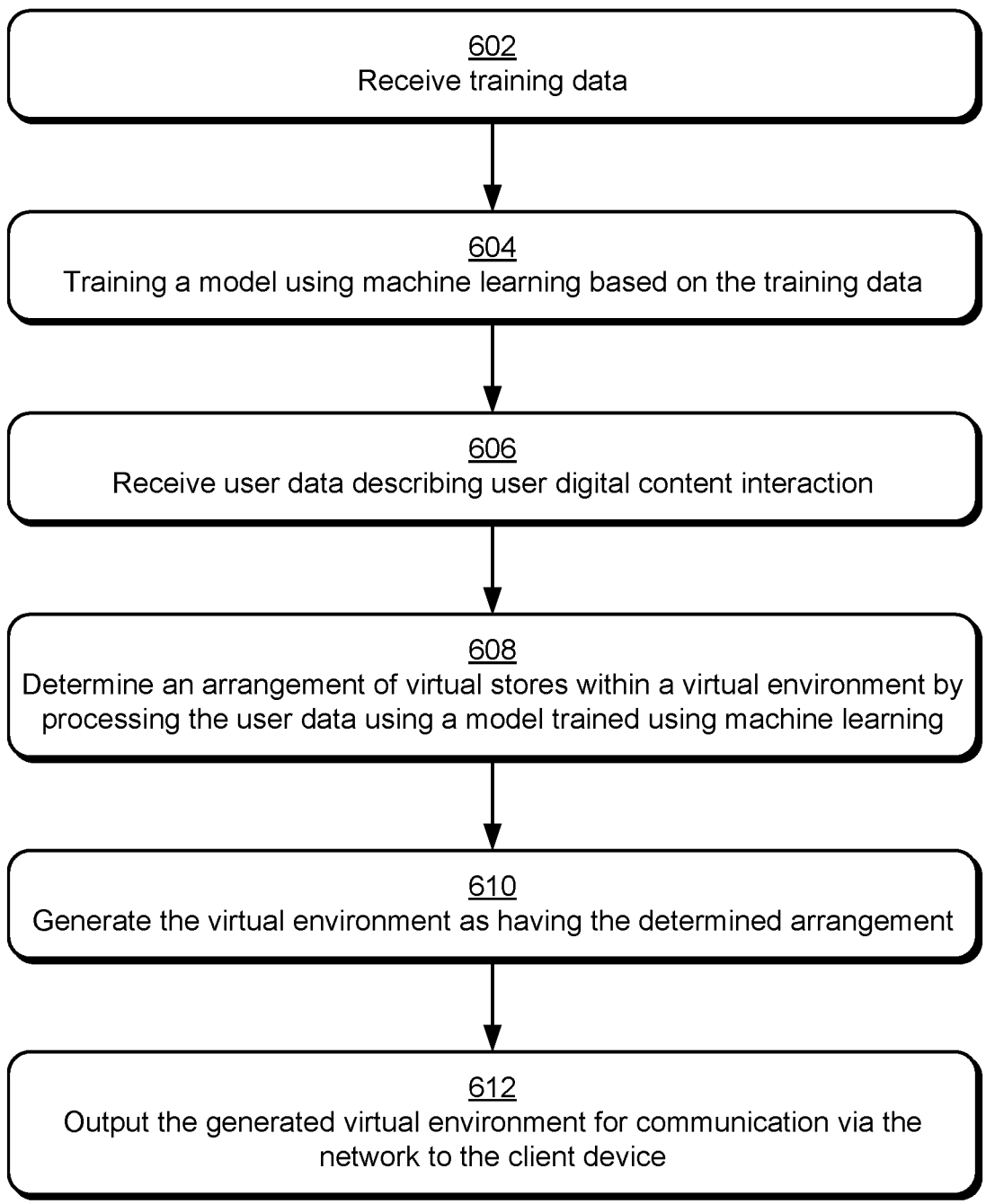
FIG. 6 is a flow diagram depicting a procedure in an example implementation of training and use of a model using machine learning to configure a virtual environment.

FIG. 5 depicts a system 500 in an example implementation showing operation of the virtual environment platform of FIG. 2 in greater detail as employing machine learning techniques as part of configuration of a virtual environment 120. FIG. 6 depicts a procedure 600 in an example implementation of training and use of a model using machine learning to configure a virtual environment.

The following discussion describes techniques that may be implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-6.

To begin in this example, training data is received (block 602) and used to train a model using machine learning (block 604). As illustrated in FIG. 5, a training data collection module 502 is configured to collect training data 504, which may leverage a variety of different sources 506.

The training data 504, for instance, may describe past user interaction associated with the user ID 206 of FIG. 2 involving interaction with previous virtual environments. Data generated by monitoring this interaction includes user interaction with virtual stores, virtual digital content, virtual streets, and/or supporting objects. This data may thus describe overall preferences of the user with respect to the virtual environment, and from this, is leveraged by a model training module 508 to train a model 510 using machine learning to identify those preferences. Outcomes, for which, the model is trained include user efficiency in navigation of the virtual environment 120 through arrangement of virtual stores, virtual streets, and virtual digital content, conversion of a good or service, etc.

In another example, the training data 504 describes user interaction "outside" of the virtual environment. The training data 504, for instance, may be collected based on past user interaction with digital marketing content and whether conversion occurred, characteristics of the digital content (e.g., appearance, type), goods or services associated with the digital marketing content, and so forth. In this example, the model 510 is then trained by a model training module 508 to configure the virtual environment 120 based on insights gained from processing, such as to arrange the virtual stores, virtual streets, and/or virtual digital content within the virtual stores. This also includes configuring a look and feel (i.e., appearance) based on these insights, e.g., preferred colors, themes, and so forth.

As used herein, the terms "model" and "machine learning" refer to a computer representation that can be tuned (e.g., trained) based on inputs to approximate unknown functions by a computing device. In particular, this may include a model that utilizes algorithms to learn from, and make predictions on, known data by analyzing the known data to learn to generate outputs that reflect patterns and attributes of the known data. For instance, a model can include but is not limited to, decision trees, support vector machines, linear regression, logistic regression, Bayesian networks, random forest learning, dimensionality reduction algorithms, boosting algorithms, artificial neural networks, deep learning, and so forth. Thus, a model when employed as part of machine-learning makes high-level abstractions in data by generating data-driven predictions or decisions from the known input data.

The trained model 510 is then passed by the model training module 508 for use by the virtual configuration module 216. User data 512 received by the virtual configuration module 216 that describes user digital content interaction (block 606) is then processed using the model 510 to generate configuration data 218 to determine an arrangement of virtual stores within the virtual environment 120 (block 608). Continuing with the previous example, the user data 512 may describe user interaction with virtual environments, characteristics of the user, user interaction with digital content "outside" of a virtual environment, and so on.

As before, the virtual environment 120 is then generated by the virtual generation module 220 as having the determined arrangement (block 610) and output by the output module 224 for communication via the network 106 to the client device 104 (block 612). In the illustrated example, monitored interaction with the virtual environment 120 is used to further collect training data 504 for training subsequent models 510 using machine learning. In this way, the virtual environment platform 116 adapts to further user interaction, which is not possible to be performed by a human being.

Figure 7:
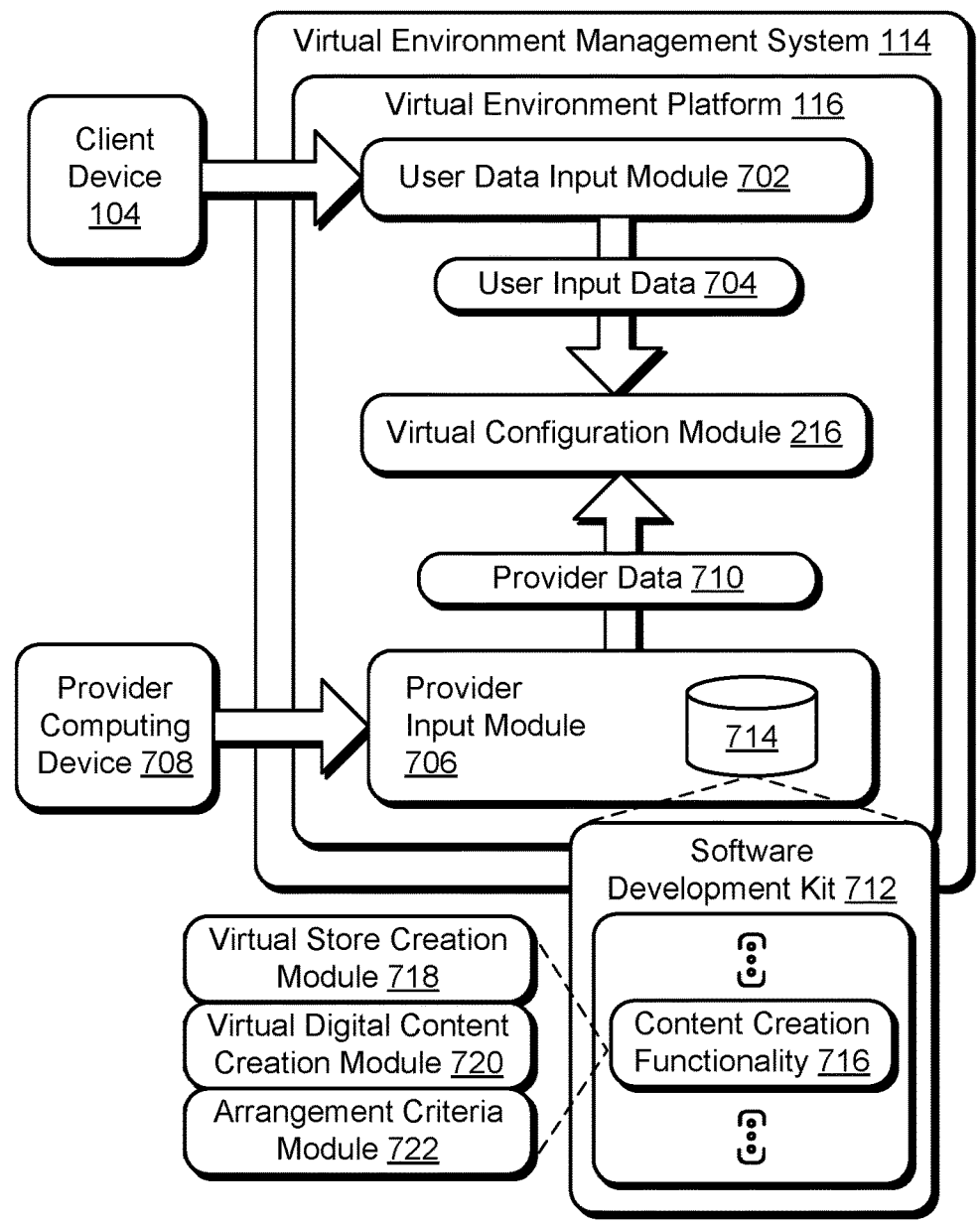
FIG. 7 depicts a system in an example implementation in which data input by a user of the client device and/or a provider of a virtual store is used as part of configuration of a virtual environment.

FIG. 7 depicts a system 700 in an example implementation in which data input by a user of the client device 104 and/or a provider of a virtual store is used as part of configuration of a virtual environment. The virtual environment platform 116 includes a user data input module 702 that is configured to collect user input data 704 from the client device 104. The user input data 704, for instance, describes manual arrangement of virtual stores 124 and virtual digital content 126 within the virtual stores 124. The user input data 704 may also describe an appearance of the virtual stores 124 or virtual digital content 126, overall display themes, and so forth.

Yet further, the user input data 704 may also describe weights to be given to characteristics used as a basis for automated arrangement of the virtual stores 124, virtual digital content 126, support objects 128, virtual streets 122, and so on. As previously described, tags may be associated with virtual stores 124, e.g., by a provider of the stores, through classification by machine learning, and so forth. These tags are then usable to arrange the virtual stores within the virtual environment by the virtual environment management system 114, automatically and without user intervention. In this example, the user input data 704 includes weights assigned by a user of the client device 104 via a user interface that are to be considered by the virtual configuration module 216 as part of this arrangement. A user, for instance, may specify greater weights to be given to virtual stores 124 having particular types of goods or services, has a particular appearance, and so forth that is used as a basis to arrange the virtual stores 124 and/or virtual digital content 126 within the virtual stores 124. Weights may also be utilized to change the order of virtual stores by changing the weights assigned to corresponding tags. A variety of other examples are also contemplated involving virtual streets 122, support objects 128, and so forth.

The virtual environment platform 116 also includes a provider input module 706 that is configured for exposure to a provider computing device 708 to generate provider data 710 that is usable by the virtual configuration module 216 as part of configuring the virtual environment 120. A provider is an entity that is associated with a virtual store, e.g., a "seller" of good or services represented by virtual digital content within the virtual stores.

To support this, the provider input module 706 exposes a software development kit 712 having content creation functionality 716 to create virtual stores 124, virtual digital content 126, support objects 128 and even virtual streets 122 for inclusion as part of the virtual environment 120. Examples of this functionality are illustrated as a virtual store creation module 718, virtual digital content creation module 720 and arrangement criteria creation module 722.

The software development kit, for instance, is configured as a single executable that includes compiling, debugging, and a software framework of the object for inclusion in the virtual environment. Application programming interfaces are included as part of the software development kit 712 as templates and reusable functions that are configured to enable content created by the provider to function as part of the virtual environment 120. The software development kit 712 is also usable by a user of the client device 104, e.g., to input the user input data 704 as well as support content creation functionality. As a result, the virtual environment platform 116 supports functionality to unite providers and clients within a virtual environment 120.

Example System and Device

Figure 8:
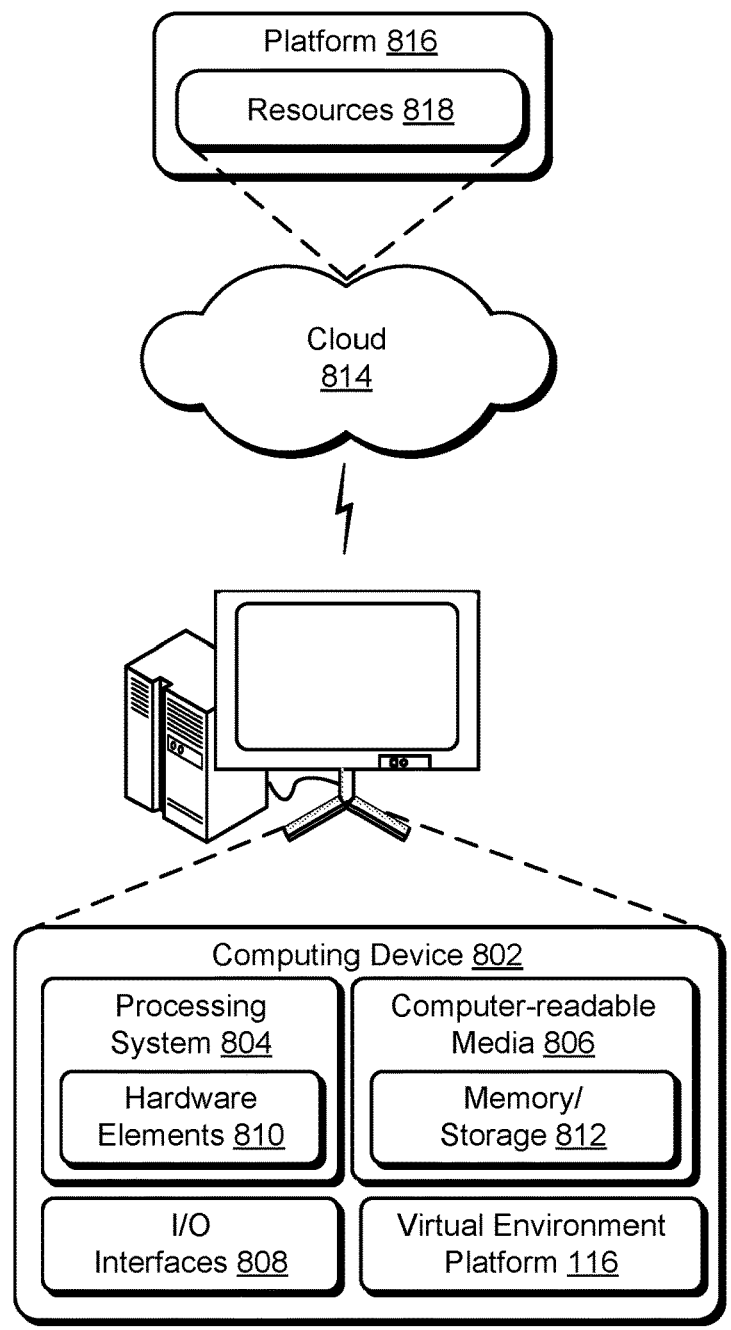
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the virtual environment platform 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

training, by the computing device, a machine learning model to manage, based on tags corresponding to virtual stores within a virtual environment implemented by a platform, arrangement of the virtual stores along virtual streets within the virtual environment implemented by the platform;

receiving, by the computing device, a request via a network from a client device to access the platform implementing the virtual environment, the request including a user identifier (user ID);

locating, by the computing device, user data corresponding to the user ID;

assigning, by the computing device, via the machine learning model and based on the user data, the tags corresponding to the virtual stores within the virtual environment implemented by the platform;

generating, by the computing device, via the machine learning model and based on the user data and the tags corresponding to the virtual stores within the virtual environment implemented by the platform, the arrangement of the virtual stores along the virtual streets within the virtual environment;

generating, by the computing device, the virtual environment as having the generated arrangement; and outputting, by the computing device, the generated virtual environment for communication via the network to the client device.

2. The method as described in claim 1, wherein the generating further includes determining the arrangement of the virtual stores along the virtual streets within the virtual environment along a plurality of axis.

3. The method as described in claim 1, wherein the virtual streets include indicators within the virtual environment of a respective criteria used to group respective said virtual stores along respective said virtual streets.

4. The method as described in claim 1, wherein the generating further includes generating an arrangement of virtual digital content within respective virtual stores of the virtual stores.

5. The method as described in claim 1, wherein the generating is further based, at least in part, on data received from service providers associated with respective ones of the virtual stores as customizing the respective virtual stores.

6. The method as described in claim 1, wherein the user data further includes customization data input by a user associated with the user ID and the generating is based at least in part on the customization data.

7. The method as described in claim 1, wherein the user data describes past user interaction associated with the user ID with digital content.

8. The method as described in claim 1, wherein the virtual stores are depicted as mimicking physical stores.

9. A computing device comprising:

a processing system; and a computer-readable storage medium having instructions stored thereon that responsive to execution by the processing system, causes the processing system to perform operations including:

training a machine learning model to manage, based on tags corresponding to virtual stores within a virtual environment implemented by a platform, arrangement of the virtual stores along virtual streets within the virtual environment implemented by the platform;

receiving a request via a network from a client device to access the platform implementing the virtual environment, the request including a user identifier (user ID);

locating user data corresponding to the user ID;

assigning via the machine learning model and based on the user data, the tags corresponding to the virtual stores within the virtual environment implemented by the platform;

generating via the machine learning model and based on the user data and the tags corresponding to the virtual stores within the virtual environment implemented by the platform, the arrangement of the virtual stores along the virtual streets within the virtual environment;

generating the virtual environment as having the generated arrangement; and outputting the generated virtual environment for communication via the network to the client device.

10. The computing device as described in claim 9, wherein the generating further includes determining the arrangement of the virtual stores along the virtual streets within the virtual environment along a plurality of axis.

11. The computing device as described in claim 9, wherein the virtual streets include indicators within the virtual environment of a respective criteria used to group respective said virtual stores along respective said virtual streets.

12. The computing device as described in claim 9, wherein the generating further includes determining an arrangement of virtual digital content within respective virtual stores of the virtual stores.

13. The computing device as described in claim 9, wherein the generating is further based, at least in part, on data received from service providers associated with respective ones of the virtual stores as customizing the respective virtual stores.

14. The computing device as described in claim 9, wherein the user data further includes customization data input by a user associated with the user ID and the generating is based at least in part on the customization data.

15. One or more non-transitory computer-readable storage media comprising instructions stored that, responsive to execution by one or more processors, perform operations comprising:

training a machine learning model to manage, based on tags corresponding to virtual stores within a virtual environment implemented by a platform, arrangement of the virtual stores along virtual streets within the virtual environment implemented by the platform;

receiving a request via a network from a client device to access the platform implementing the virtual environment, the request including a user identifier (user ID);

locating user data corresponding to the user ID;

assigning via the machine learning model and based on the user data, the tags corresponding to the virtual stores within the virtual environment implemented by the platform;

generating via the machine learning model and based on the user data and the tags corresponding to the virtual stores within the virtual environment implemented by the platform, the arrangement of the virtual stores along the virtual streets within the virtual environment;

generating the virtual environment as having the generated arrangement; and outputting the generated virtual environment for communication via the network to the client device.

16. The one or more non-transitory computer-readable storage media of claim 15, wherein the generating further includes generating the arrangement of the virtual stores along the virtual streets within the virtual environment along a plurality of axis.

17. The one or more non-transitory computer-readable storage media of claim 15, wherein the virtual streets include indicators within the virtual environment of a respective criteria used to group respective said virtual stores along respective said virtual streets.

18. The one or more non-transitory computer-readable storage media of claim 15, wherein the generating further includes generating an arrangement of virtual digital content within respective virtual stores of the virtual stores.

19. The method as described in claim 1, wherein the assigning of the tags corresponding to the virtual stores includes determining, via the machine learning model, correlations between the virtual stores and virtual digital content based on the user data.

20. The method as described in claim 1, further comprising generating, by the computing device, weights assigned to the tags corresponding to the virtual stores based on the user data, and wherein the generating of the generated arrangement is based on the weights assigned to the tags corresponding to the virtual stores based on the user data.

* * * * *